Aug. 8, 1933.   A. CLEMENTI   1,920,959
APPARATUS FOR ADJUSTING AIRCRAFT FOR A PREDETERMINED COURSE
Filed Dec. 24, 1931
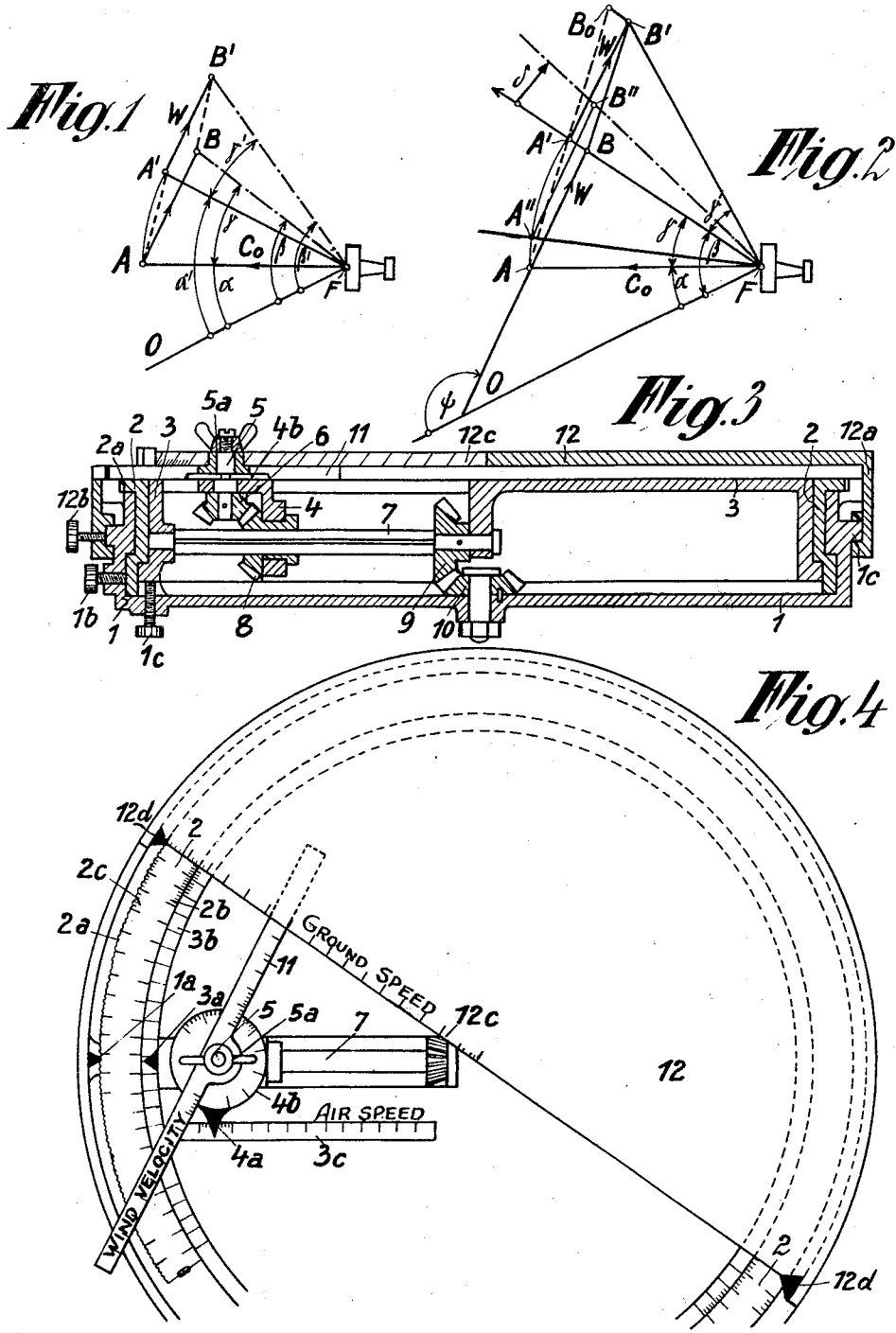
Inventor:
A. Clementi,
By [signature]
Atty Patented Aug. 8, 1933

1,920,959

UNITED STATES PATENT OFFICE 1,920,959

APPARATUS FOR ADJUSTING AIRCRAFT FOR A PREDETERMINED COURSE

Antonio Clementi, Vienna, Austria, assignor to the firm Actiengesellschaft C. P. Goerz Optische Anstalt Actiova spolecnost K. P. Goerz opticky ústav, Bratislava, Czechoslovakia, a Company of Czechoslovakia Application December 24, 1931, Serial No. 583,057, and in Italy January 3, 1931

1 Claim. (Cl. 33—76)

The object of my invention is to mechanically determine the angle that the longitudinal axis of an air craft must make with the direction indicated by the compass in order that at any direction and strength of the wind the air craft may follow a predetermined course.

With this object in view my invention consists in that within a circular annular scale mounted rotatably on a base plate and adapted to be locked in position thereon, a circular scale serving as a drift scale is mounted rotatably and is adapted to be locked in position. This drift scale is provided with a radial slot along which extends a longitudinal scale serving as the scale of the velocity of the air craft itself. In this slot is slidably mounted a slide provided with a pointer for marking the adjustment for the velocity of the air craft, and further provided with a circular scale for reading the relative direction of the wind. The slide carries a journal pin perpendicular to the wind direction scale and on this journal pin is rotatably mounted above the wind direction scale a rule provided with a longitudinal scale for indicating the velocity of the wind. On rotating the slotted disc relatively to the base plate a rule is maintained parallel to itself by any suitable means while for the angular adjustment of the slotted disc a radial rule is provided which is rotatable around the axis of this slotted disc and is provided with a longitudinal scale for the speed of travel. This last named rule is adjustable by means of a pointer mark on the outer circular scale of the scale ring.

An embodiment of the invention is illustrated by way of example in the annexed drawing.

Fig. 1 shows the geometrical basis of the invention the speed of travel having to be maintained. Fig. 2 is similar to Fig. 1 the direction of travel having to be adjusted, Fig. 3 is a diametrical section of the apparatus and Fig. 4 is a plan view.

In Fig. 1, F indicates the position of the air craft at a given instant. $FA=C_0$ represents the readily observable theoretical velocity of the air craft imparted to it by the propellers in the absence of any wind and plotted in the direction of its axis. The angle $AFO=\alpha$ is the angle between the axis of the air craft and the compass zero direction FO; $FB=c$ indicates by length and direction the actual speed of travel of the air craft in the direction of travel FB making an angle $OFB=\beta$ with the compass zero direction. This speed depends on the strength and direction of the wind. Hence the angle $AFB=\gamma=\beta=\alpha$ represents the drift angle and FAB is simply the well known speed triangle. If now it is desired that the air craft should travel in another direction FB' at an angle $\beta'$ with the compass zero direction FO, then the necessary change of the axis angle $\alpha'$ to be adjusted by means of the compass will be found by rotating the line AF around its end F and shifting the line AB parallel to itself so far that the point B falls into the new direction of travel FB' and the point A into the arc of a circle AA' struck around F the radius of this arc being $AF=A^1F=C_0$. This simple construction is based on the suppositions that the speed component $AB=w$ of the air craft due to the drift is independent of the position of the axis of the air craft relatively to the direction of wind and that the speed component of the air craft in its longitudinal axis and the direction and strength of wind and hence also the speed component $w$ of the air craft due to wind are constant during the observation and the construction of the line $FB^1$. These suppositions are permissible with satisfactory accuracy in practice. It will be noted that the triangle FA' B' is again the well known speed triangle in respect of the new direction FA' of the axis of the air craft.

If, however, only the readily observable direction FB of the travel of the air craft at the angle $\beta$ to the zero direction FO indicated by the compass and the direction FA of the axis of the air craft at an angle $\gamma$ to the direction FB of travel and the theoretical speed of the aircraft imparted to it by the propeller in the absence of wind are known but not the actual speed of travel $c=FB$ then the component of the speed of the air craft due to drift can be determined by the following method illustrated by Fig. 2 making of course the suppositions above pointed out.

The axis of the air craft is first brought into the direction of travel FB previously observed of the air craft and the direction of travel FB' at an angle $\gamma$ to FB corresponding to this new direction of the axis of the air craft is observed. On the line FB is plotted the distance $FA'=FA=C_0$ that is to say the theoretical velocity or air speed imparted to the air craft by its propeller. Then the straight line AA' is extended up to $B_0$, $A'B_0$ being made equal to AA' and the line $AA'B_0$ is shifted parallel to itself with the point A' moving along the line FA' until the point $B_0$ of the line $AA'B_0$ reaches the line FB' and the point A' comes into the position B. Thereby the component $A'B'=w$ of the actual speed of the aircraft due to drift by the wind is determined which is parallel and equal to AB and makes an angle $\psi$ with the zero direction indicated by the compass.

If now the air craft has to be adjusted for a new course at an angle δ to the previous one then the point A' of the straight line A'B' is moved along the arc of the circle struck around F with the radius $C_o=FA$ until the other end B' of this straight line reaches the desired new direction FB'' of the course of the air craft and the end A' of this line comes into the position A''. If then the axis of the air craft is brought into the direction FA'' the air craft will move in the desired new direction FB'', FA''B'' being the speed triangle in respect of the direction.

My apparatus serves for the purpose to carry out the geometrical construction above described mechanically.

My apparatus comprises a circular base plate 1 in which is coaxially and rotatably mounted a ring 2 provided with a knurled edge 2a and an inner and an outer circumferential scale 2b and 2c respectively. A clamping screw 1b serves for locking the ring 2 in any position to which it may have been adjusted. Within this ring is rotatably mounted a disc 3 adapted to be locked in position and provided with a pointer 3a and a drift indicating scale 3b. The disc 3 is furthermore equipped with a radial slot provided with a longitudinal scale 3c for indicating the velocity imparted to the air craft in absence of any wind and in this radial slot is slidably mounted a slide 4 provided with a pointer 4a, a very thin disc 4b carrying a circular division and a vertical journal pin rotatably mounted therein. To the bottom end of this journal pin is secured a bevel pinion 6 meshing with a bevel pinion 8 of equal size on a radial shaft 7 rotatably mounted below the above mentioned radial slot. This bevel wheel 8 is mounted rotatably in the radially guided slide 4, but is locked against axial movements and is connected with its shaft by a key and grooves which latter extend over the entire length of the shaft 7 both ends of which are journalled in the scale disc 3 and carries near the axis of the same a bevel wheel 9 meeting with a bevel wheel 10 of equal size mounted centrally on the base plate 1. The four bevel wheels must cooperate in such a manner that a rule 11 rotatably mounted on the journal pin 5 and adapted to be locked in position by a clamping screw 5a is always kept parallel to itself notwithstanding any rotation of the scale disc 3 relatively to the base plate 1. This rule 11 is provided with longitudinal scales extending symmetrically on both sides of its journal pin 5, these scales indicating drift speeds. On the outer flange 1c of the base plate is rotatably mounted a cover plate 12 provided with a downwardly extending flange 12a and is adapted to be locked in position by a clamping screw 12b. This cover plate has a semi-circular opening one side of which is provided with a longitudinal scale 12c formed by a diameter of the cover plate. This scale 12c serves to indicate the speed in the actual direction of travel. Each end of the rectilinear diametrical side of the opening is provided with a pointer 12d for facilitating the reading of the angle β of the actual course on the outer scale 2c of the ring 2. The operation of the apparatus is as follows:

The angle α, Fig. 1, existing at any moment between the axis of the air craft and the direction FO indicated by the compass is indicated by means of the pointer 1a on the outer scale 2c of the scale ring 2 whereupon this scale ring is clamped in position by the clamping screw 1b. Then the scale disc 3 is so adjusted and locked in position by the clamping screw 1c that the pointer 3a is opposite the pointer 1a. These two pointers indicate the direction of the longitudinal axis of the air craft. Thereupon the slide 4 is shifted radially so far that the pointer 4a indicates on the radial scale 3a the velocity imparted to the air craft by its propeller and the diametrical side of the scale 12c of the cover plate 12 is adjusted on the scale 3b in accordance with the drift angle γ determined in any desired manner whereupon the cover plate is locked in position. Then after loosening the clamping screw 5a the rule 11 rotatable around the journal pin 5 is turned so far that the divided edge of this rule passing through the centre of the journal pin 5 indicates on the diametrical scale 12c of the cover plate the actual speed of travel of the aircraft in the direction of travel which speed has been previously determined in any manner. Thus on the division of the rule 11 the value of the component of the speed of the air craft due to the wind is indicated while the angle between the direction of this component and the axis of the air craft is indicated on the circular scale 4b by the rule 11 and may be directly read. The angle between the direction of this component and the compass zero direction, the angle of Fig. 2 is given by the sum of the readings on the scales 4b and 2b.

It will be understood that in the case described with reference to Fig. 2 the apparatus above described will have to be used in a similar manner, the direction of the course has to be changed by any desired angle the actual speed of the air craft not being known.

What I claim is:

An apparatus for adjusting air crafts for a predetermined course in case of wind, comprising, in combination with a base plate, a scale ring rotatably mounted in the said base plate and provided with means for locking it in position, a scale disc concentric to and rotatably mounted in the said scale ring and provided with means for locking it in position in the said scale ring, there being a radial slot in the said scale disc and provided with a longitudinal scale, a slide guided in the said slot and provided with a pointer moving along the said longitudinal scale, a journal pin perpendicular to the said scale disc carried by the said slide and a circular scale concentric to the said journal pin, a rule provided with a longitudinal scale rotatably mounted on the said journal pin with means for locking it in position, a gearing operatively connecting the said base plate with the said journal pin and rule for maintaining the said rule parallel to itself for all angular adjustments of base plate and scale disc and a scale diametrical of said base plate with pointers at its ends moving along a scale of the said scale ring and rotatably mounted on the said base plate, with means for clamping it in position, the scales of the said diametrical scale and the said rule being adapted to move along each other.

ANTONIO CLEMENTI.